TRANSISTOR TRIGGER CIRCUIT WITH TUBE CONTROLLING EMITTER

Filed May 20, 1954 2 Sheets-Sheet 1

*INVENTOR.*
CARL A. BERGFORS
*BY* P. E. Henninger
ATTORNEY

*INVENTOR.*
CARL A. BERGFORS
*BY* P. E. Henninger
ATTORNEY 2,825,806
Patented Mar. 4, 1958

1

2,825,806

TRANSISTOR TRIGGER CIRCUIT WITH TUBE CONTROLLING EMITTER

Carl A. Bergfors, San Jose, Calif., assignor to International Business Machines Corporation, New York, N. Y., a corporation of New York Application May 20, 1954, Serial No. 431,217

7 Claims. (Cl. 250—27)

This invention relates to trigger circuits and especially to scaling trigger circuits of the type including a transistor and a vacuum tube connected in series with and controlling the flow of current to the emitter of the transistor.

There is disclosed in the copending application of Arthur H. Dickinson, Serial No. 177,447, filed August 3, 1950, entitled "Electronic Amplifier," a trigger circuit including a transistor and a vacuum tube controlling the flow of current through the emitter. That circuit has a stability approaching that of a circuit employing tubes only, without transistors, and it is from that standpoint superior to trigger circuits employing transistors alone. That circuit also has low power requirements approximating the power requirements of a trigger circuit employing transistors alone, and it is from that standpoint a considerable improvement over vacuum tube trigger circuits.

The trigger circuit disclosed in the Dickinson application mentioned above is a bistable circuit, i. e., it has two stable output states in either of which it tends to remain once it is established there. It is provided with two sets of input terminals and is switched back and forth between the output states upon receipt of input signals alternately at the two sets of input terminals. Such a circuit is commonly termed a non-scaling trigger circuit or a latching circuit. A more useful type of trigger circuit for many purposes, for example, high speed computers, is known as a scaling circuit or a binary trigger in that it has only one set of input terminals and produces one output signal pulse in response to the receipt at those terminals of two successive input pulses of the same polarity. It may therefore be said to scale or count the input pulses according to a binary counting system.

It is an object of the present invention to provide an improved scaling trigger circuit of the tube and transistor type.

Another object is to provide an improved scaling trigger circuit of the type described in which the tube is connected in series with the emitter of the transistor.

Another object is to provide an improved scaling trigger circuit of the type described having all its impedance elements fixed, i. e., requiring no impedance adjustment to make the circuit function.

Another object is to provide a circuit of the type described which, as compared to similar circuits of the prior art, is operable at an increased impulse rate.

Another object is to provide a circuit of the type described having reduced power requirements and consequently reduced heating of the circuit elements, with the resultant increased life of the tube and transistor elements.

The foregoing and other objects of the invention are

2 attained in the circuit described herein by providing a tube connected in series with the emitter of a transistor, and an input signal transmitting arrangement which simultaneously transmits negative impulses to the control electrode of the tube and to the base of the transistor. Means are also provided for stabilizing the potential of the cathode of the tube and the emitter of the transistor during certain critical phases of the operating cycle of the circuit. This stabilizing means comprises suitable impedance elements connected between the cathode and emitter on the one hand and the grounded battery terminal on the other. These impedance elements may comprise a parallel resistor and capacitor. Alternatively, a diode may be connected in series with the resistor, or a diode may be used alone, with no resistor or capacitor in circuit.

Other objects and advantages of the invention will become apparent from a consideration of the following specification, taken together with the accompanying drawing.

FIG. 1

Figure 1:
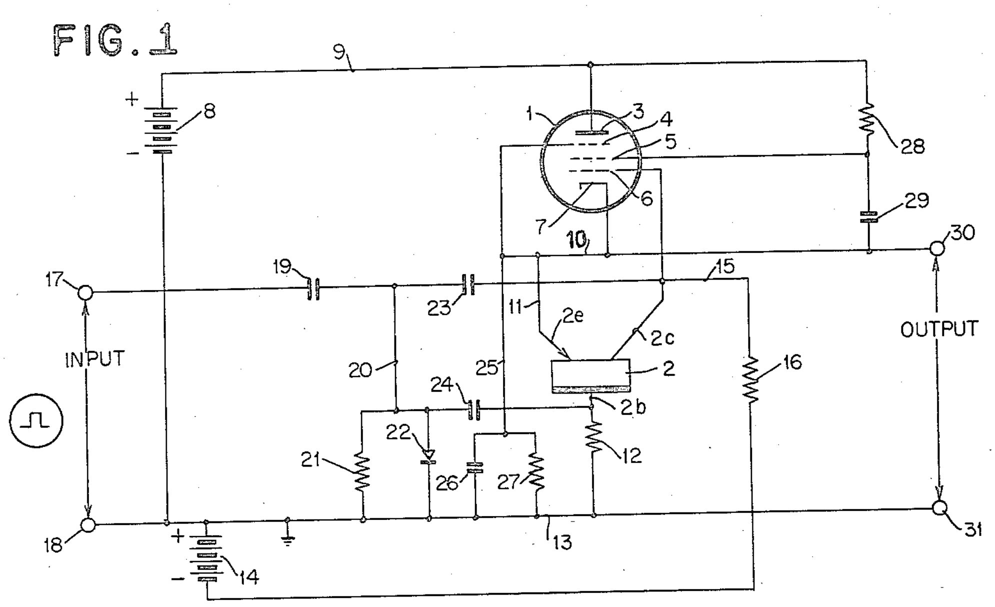
Fig. 1 is a wiring diagram of a scaling trigger circuit embodying the invention and utilizing a pentode tube.

The circuit illustrated in this figure includes a pentode 1 and a transistor 2. The pentode 1 is provided with an anode 3, electrodes 4, 5 and 6, and a cathode 7. The transistor comprises an emitter electrode 2*e*, a collector electrode 2*c* and a base electrode 2*b*.

A battery 8 serves as the power supply for the output circuit of pentode 1, which may be traced from the positive terminal of battery 8 through a wire 9, anode 3, cathode 7, wires 10 and 11, emitter 2*e*, base electrode 2*b* and base resistor 12 to a grounded wire 13, and thence back to the negative terminal of battery 8. It should be noted that the foregoing circuit includes the anode and cathode of the tube in series with the emitter 2*e* of the transistor.

A battery 14 serves as the power supply for the output circuit of transistor 2, which may be traced from the positive terminal of battery 14 through the grounded conductor 13, resistor 12, base electrode 2*b*, collector electrode 2*c*, a wire 15, and a resistor 16 back to the negative terminal of battery 14.

Input signals are received at input terminals 17 and 18, in the form of square wave impulses during part of which impulses the terminal 17 is positive with respect to terminal 18. Terminal 18 is connected to grounded conductor 13. The input signals pass from terminal 17 through a capacitor 19, a wire 20 and a resistor 21 in parallel with the diode 22, to the grounded wire 13. Wire 20 is connected through a capacitor 23 to control electrode 6 of pentode 1, and is also connected through a capacitor 24 to base electrode 2*b*.

The potential of cathode 7 and emitter 2*e* is stabilized, in a manner to be described more fully below, by means of a connection between wire 10 and wire 13, including a wire 25 and a capacitor 26 in parallel with a resistor 27. Capacitor 26 and resistor 27 must have impedance values which are high compared to the emitter-base impedance of transistor 2, so that they do not shunt the emitter-base impedance, but, on the contrary, force most of the current flowing through tube 1 to pass through the emitter.

Electrode 4 of pentode 1 is operated at cathode potential by connecting it to the wire 10. Electrode 5 is provided with a suitable positive operating potential by connecting it through a resistor 28 to wire 9 and the positive terminal of battery 8. A capacitor 29 connected between electrode 5 and wire 10 stabilizes the potential of the electrode 5 with respect to cathode 7.

Output terminals 30 and 31 are respectively connected to wire 10 and to the grounded wire 13.

*Operation of Fig. 1*

The circuit of Fig. 1 has two stable output states, in one of which, hereinafter referred to as the "on" state, the pentode 1 and the output circuit of transistor 2 are both substantially conductive, and in the other of which, hereinafter referred to as the "off" state, the pentode 1 and the output circuit of transistor 2 are both substantially nonconductive.

When operation of the circuit is initiated, it will assume one of its two stable states. For the purposes of the present discussion, it may be considered that it starts in the "on" state. In this condition, the potential drop across resistor 16 in the output circuit of transistor 2 is sufficient so that the control electrode 6 of pentode 1 is biased to a potential sufficiently high so that the pentode 1 is conducting a substantial current. The emitter 2*e* is positive with respect to the base 2*b*, so that the transistor 2 also conducts a substantial current.

Under these conditions, a square wave input signal is received at the terminals 17 and 18. The capacitor 19 and resistor 21 function as a differentiating circuit so that signal impulses appear between wire 20 and grounded wire 13 at the beginning and the end of each square wave input signal, when the input signal potential is changing rapidly. The diode 22 is effective to shunt the signal impulses associated with the leading or positive-going edge of the square wave input signal, so that only the signal impulses corresponding to the trailing or negative-going edge of the input signal are transmitted through capacitors 23 and 24 to control electrode 6 and base 2*b*. These trailing edge impulses are of a polarity such that wire 20 is then negative with respect to grounded wire 13.

The negative impulse transmitted through capacitor 24 to base 2*b* is substantially ineffective. The only effect it might have would be to make the transistor 2 more conductive, because it makes the base 2*b* more negative with respect to emitter 2*e*, but the transistor is already operating substantially at its maximum current output, and hence no further increase in its output is possible. The negative signal pulse transmitted through capacitor 23 to control electrode 6 is effective to reduce the conductivity of pentode 1, thereby reducing the current flow through emitter 2*e*. The transistor responds in accordance with the characteristics of such devices to reduce the current flow through the collector electrode 2*c*, thereby reducing the potential drop across resistor 16 and making the control electrode 6 even more negative. The process continues cumulatively, with continued reduction of emitter current 2*e* and of the collector current 2*c* until the control electrode 6 reaches a potential where current flow through the pentode 1 is cut off, whereupon the circuit is in its "off" state.

In the "off" state, there still continues a small current flow through the output circuit of the transistor 2. This current is small enough, however, so that only a small potential drop is developed across resistor 16. Thus the potential of wire 15 and control electrode 6 approaches that of the negative terminal of battery 14, and current flow through pentode 1 is therefore cut off.

With the circuit in its "off" condition, assume that a second square wave input signal is received at terminals 17 and 18. As before, this signal results in negative impulses being transmitted to the control electrode 6 and to the base 2*b*. The negative impulse transmitted to control electrode 6 is now ineffective, since the pentode 1 is already cut off and the negative input pulse cannot cut it off any further.

The negative impulse transmitted to base 2*b*, however, is effective to lower the base potential below the potential of emitter 2*e*, the latter being stabilized at ground potential by capacitor 26 and resistor 27. More specifically, the capacitor 26 is then substantially completely discharged, and so is effective when the negative input pulse is received at base 2*b*, to hold the emitter 2*e* at ground potential throughout the effective duration of that pulse, since the charging time of the capacitor is considerably greater than the duration of the negative-going portion of the pulse. If the capacitor 26 were not present, then the current drawn from emitter 2*e* by the negative pulse would produce a potential drop across resistor 27, tending to lower the potential of emitter 2*e* and reducing the effectiveness of the signal pulse.

The emitter and collector circuits of transistor 2 therefore become increasingly conductive and the increasing current flow through collector 2*c* produces an increasing potential drop across resistor 16 which raises the potential of control electrode 6, thereby allowing pentode 1 to conduct current. This current flow through pentode 1 passes through the emitter 2*e* causing a further increase in the collector current of transistor 2 and a further rise in potential of control electrode 6 with a resulting further increase in the current flow through pentode 1. This process continues cumulatively until the transistor 2 reaches a saturation condition in which further increases in the emitter current do not produce any increase in the collector current.

The output potential is conveniently taken between the wire 10 and the grounded wire 13. During the "off" state, these wires are substantially at the same potential, but during the "on" state the potential of wire 10 is substantially raised due to the current flow through emitter 2*e* and the resulting potential drop through transistor 2 and across the base resistor 12.

A circuit constructed in accordance with Fig. 1 has been successfully operated at input pulse rates varying from 0 to 4 kilocycles per second.

FIG. 2

Figure 2:
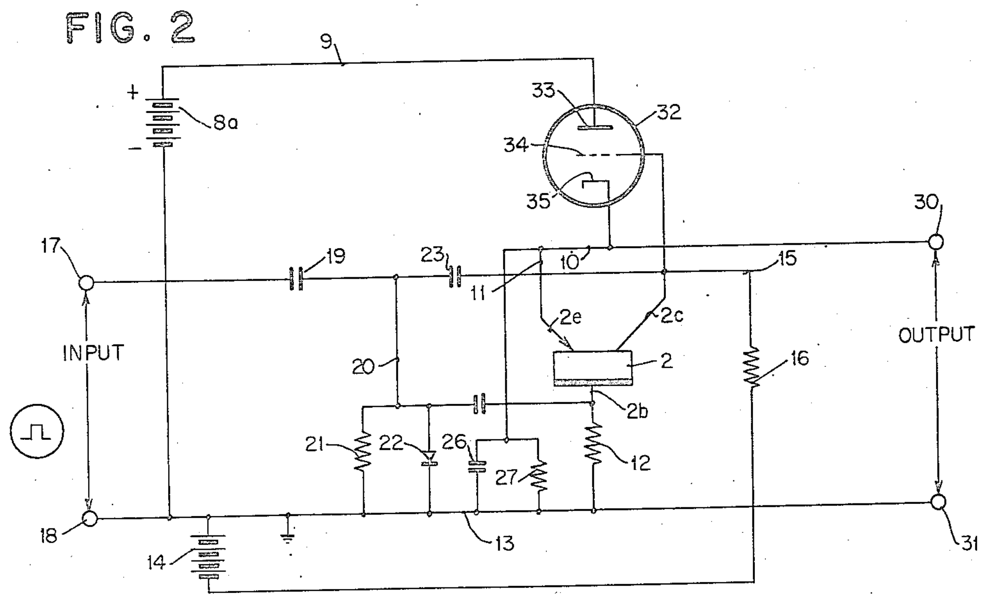
Fig. 2 is a wiring diagram of a modified form of circuit embodying the invention and utilizing a triode tube.

The circuit of Fig. 2 is substantially the same as that of Fig. 1 except that a triode 32 having an anode 33, a control electrode 34 and a cathode 35 is employed in place of the pentode 1 of Fig. 1. The other circuit elements and the operation of the circuit are substantially the same as in Fig. 1, and will not be further described.

A circuit constructed in accordance with Fig. 2 has been successfully operated at input pulse rates varying from 0 to 6 kilocycles per second.

FIG. 3

Figure 3:
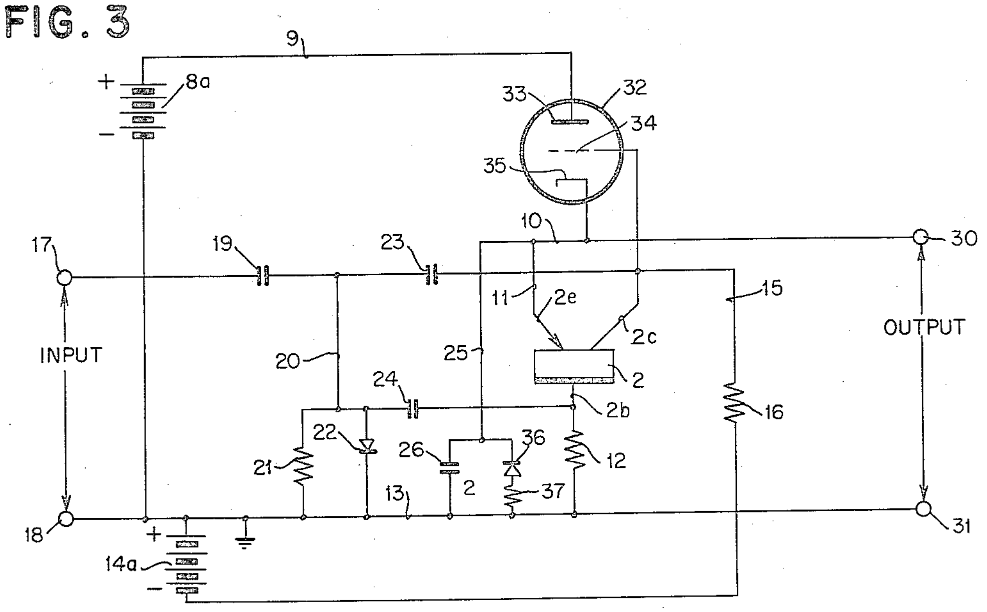
Figs. 3 and 4 are wiring diagrams of still other embodiments of the invention.

The circuit of Fig. 3 is substantially the same as the circuit of Fig. 2, except that the resistor 27 of Fig. 2 is replaced by a diode 36 in series with a resistor 37. This arrangement permits the use of a resistor 37 of substantially lower resistance than resistor 27 of Fig. 1, without adverse shunting of the emitter-base impedance of the transistor. The lower resistance of resistor 37 in turn enables a more rapid response of the transistor when it is turning "on," since the diode 36 and resistor 37 impose only a low impedance to the flow of current from grounded wire 13 through emitter 2*e* and base 2*b*, when a negative pulse is received at base 2*b*, to turn the transistor "on." Also, when the transistor is turned "off," the diode 36 presents a high impedance to the current tending to discharge the capacitor 26, and thereby capacitor 26 tends to hold the cathode 35 at its "on" potential so that the negative impulse applied to control electrode 34 is more effective to cut off the current flow through the triode 32.

A circuit constructed in accordance with Fig. 3 has been successfully operated at input pulse rates varying from 0 to 17 kilocycles per second.

FIG. 4

Figure 4:
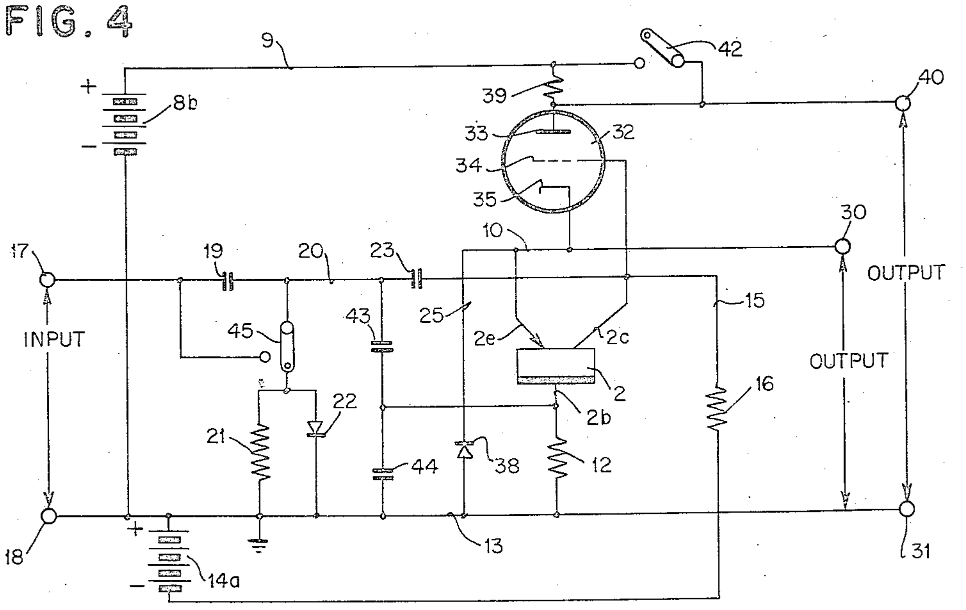

The circuit of Fig. 4 is also similar to that of Fig. 2, but differs therefrom in the use of a single diode 38 in the stabilizing connection between wire 10 and grounded wire 13. This diode 38 functions substantially in the same manner as diode 36 in Fig. 3.

The circuit of Fig. 4 is also provided with a load resistor 39 in series with the anode 33 of the tube 32. The load resistor 39 is provided so that an additional or alternative output terminal 40 may be used, together with grounded terminal 31. A switch 42 is provided to shunt the resistor 39. When switch 42 is closed, the output may be taken from the output terminals 30 and 31 as before.

In the input circuit of Fig. 4, several changes have been made. Two capacitors 43 and 44 are connected between wire 20 and wire 13. A double-throw switch 45 is provided which, in the position shown, connects the resistor 21 and diode 22 in the circuit in the same manner as in Fig. 2. Switch 45 is movable to another position in which it opens the circuit through resistor 21 and diode 22 and shunts the capacitor 19.

When the switch 45 is in the position shown in the drawing, the operation of the input circuit is substantially the same as in Fig. 2. When the switch 45 is shifted to its other position, its shunts the capacitor 19 and opens the circuit through resistor 21 and diode 22. The capacitors 43 and 44 act as a voltage divider with respect to the input signals, being selected to provide approximately one-fifth of the input pulse amplitude to the transistor base **2*b***.

At the control electrode 34 and base **2*b***, the square wave signals appear as a series of pulses of alternate polarity superimposed upon a direct potential which is determined in each case by the conductive connection between the point concerned and the other parts of the circuit.

In the case of base **2*b*, the negative pulses tend to make the base negative with respect to ground, and if the transistor is "off," to initiate conduction as in the case of the negative pulses in the circuits of Figs. 1 to 3. The positive pulses are of no effect at base 2*b*** when the transistor is "off," since their only possible effect would be to reduce the transistor conductivity. When the transistor is "on," the positive pulses reaching the base do reduce conductivity somewhat, but not enough to cause the transistor to cut off.

In the case of control electrode 34, the negative pulses tend to cut off the flow of current in the tube 32, and are effective to do so when the tube is "on." The positive pulses are of no effect when the tube is "on," but when the tube is "off," they tend to start it conducting, but that tendency is then effectively opposed by a high negative bias from battery **14*a***.

The proportioning of the impedances of capacitors 43 and 44 is determined by the relative magnitudes of the negative potential required at base **2*b* to start conduction and of the negative potential required at control electrode 34** to cut the tube "off."

The following table shows by way of example, particular sets of values for the potentials of the various batteries and for the various resistors and capacitors in circuits which have been operated successfully, one set for each of Figs. 1 to 4. It will be understood that these values are set forth by way of example only and that the invention is not limited to these values or any of them. No values are given for the asymmetric impedance elements, which may be considered to have substantially zero impedance in their forward direction and substantially infinite impedance in their reverse direction.

TABLE I

| | Fig. 1 | Fig. 2 | Fig. 3 | Fig. 4 |
|---|---|---|---|---|
| Tube 1 | 6AS6 | | | |
| Battery 8 volts | 150 | | | |
| Battery 8*a* do | | 300 | 300 | |
| Battery 8*b* do | | | | 200 |
| Resistor 12 ohms | 700 | 700 | 700 | 1,200 |
| Battery 14 volts | 45 | 45 | | |
| Battery 14*a* do | | | 55 | 55 |
| Resistor 16 ohms | 700,000 | 700,000 | 700,000 | 430,000 |
| Capacitor 19 μf | .005 | .005 | .005 | .05 |
| Resistor 21 ohms | 10,000 | 10,000 | 10,000 | 10,000 |
| Capacitor 23 μμf | 39 | 39 | 39 | 39 |
| Capacitor 24 μf | .008 | .008 | .008 | |
| Capacitor 26 μf | .006 | .006 | .006 | |
| Resistor 27 ohms | 200 | 200 | | |
| Resistor 28 do | 20,000 | | | |
| Capacitor 29 μf | 1.0 | | | |
| Tube 32 | | 12AX7 | 12AX7 | 12AX7 |
| Resistor 37 ohms | | | 0–100 | |
| Resistor 39 do | | | | 20,000 |
| Capacitor 43 μfd | | | | .0025 |
| Capacitor 44 μfd | | | | .01 |
| Input Signal Potentials volts | 35–85 | 27–88 | 10–50 | 15–90 |

While I have shown and described certain preferred embodiments of my invention, other modifications thereof will readily occur to those skilled in the art and I therefore intend my invention to be limited only by the appended claims.

I claim:

1. A scaling trigger circuit comprising a transistor having emitter, collector and base electrodes, an electric discharge device having an anode, a cathode, and at least one control electrode, means connecting said cathode to said emitter electrode, signal input means connected to said control electrode and to said base electrode for transmitting simultaneously thereto a series of signal impulses of the same polarity, said signals being ineffective at the control electrode when the tube and transistor are "off," but then effective at the base electrode to turn the transistor "on," said signals being effective at the control electrode when the tube and transistor are "on" to turn them "off," and being then ineffective at the base electrode, and means to stabilize the potential of the cathode and the emitter when the transistor and tube are "off."

2. A scaling trigger circuit comprising a transistor having emitter, collector and base electrodes, an electric discharge device having an anode, a cathode, and at least one control electrode, a first source of electrical energy, means connecting said anode to the positive terminal of said first source, means connecting said cathode to said emitter electrode, means including a base resistor connecting said base to the negative terminal of said first source, a second source of electrical energy having its positive terminal connected to the negative terminal of said first source, means including a load resistor connecting said collector to the negative terminal of said second source, means connecting said collector to said control electrode, signal input means connected to said control electrode and to said base electrode for transmitting simultaneously thereto a series of signal impulses of the same polarity, said signals being ineffective at the control electrode when the tube and transistor are "off," but then effective at the base electrode to turn the transistor "on," said signals being effective at the control electrode when the tube and transistor are "on" to turn them "off," and being then ineffective at the base electrode, and means to stabilize the potential of the cathode and the emitter when the transistor and tube are "off."

3. A scaling trigger circuit comprising a transistor having emitter, collector and base electrodes, an electric discharge device having an anode, a cathode, and at least one control electrode, a first source of electrical energy, means connecting said anode to the positive terminal of said first source, means connecting said cathode to said emitter electrode, means including a base resistor connecting said base to the negative terminal of said first source, a second source of electrical energy having its positive terminal connected to the negative terminal of said first source, means including a load resistor connecting said collector to the negative terminal of said second source, means connecting said collector to said control electrode, signal input means including a pair of input terminals, means connecting one of said input terminals to said negative terminal of said first source, means including a first capacitor connecting the other of said input terminals to said control electrode, means including a second capacitor connecting the other of said input terminals to said base electrode, and means connecting said cathode and said emitter electrode to the positive terminals of said second source, said last-named connecting means including impedance means tending to stabilize the potential of said cathode and said emitter.

4. A scaling trigger circuit as defined in claim 3, in which said stabilizing means includes a capacitor.

5. A scaling trigger circuit as defined in claim 3, in which said stabilizing means comprises a resistor and a capacitor in parallel.

6. A scaling trigger circuit as defined in claim 3, in which said stabilizing means comprises an asymmetrically conductive impedance element.

7. A scaling trigger circuit as defined in claim 3, in which said stabilizing means comprises an asymmetrically conductive impedance element and a resistor in series.

References Cited in the file of this patent

UNITED STATES PATENTS

| | | |
|---|---|---|
| 2,623,170 | Dickinson | Dec. 23, 1952 |
| 2,628,310 | Wood | Feb. 10, 1953 |